United States Patent
Ochiai et al.

(10) Patent No.: US 6,777,511 B2
(45) Date of Patent: Aug. 17, 2004

(54) PROCESS FOR PRODUCING POLY (METH) ACRYLATES HAVING REDUCED METAL CONTENT

(75) Inventors: Koshiro Ochiai, Toyonaka (JP); Akira Kamabuchi, Ashiya (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 09/956,890

(22) Filed: Sep. 21, 2001

(65) Prior Publication Data

US 2002/0055569 A1 May 9, 2002

(30) Foreign Application Priority Data

Sep. 21, 2000 (JP) ........................................ 2000-286896

(51) Int. Cl.$^7$ .................................................. C08F 6/06
(52) U.S. Cl. ........................ 526/173; 526/176; 526/177; 526/187; 526/328; 423/27; 423/54; 423/68; 423/98; 423/139; 423/150.1; 423/181
(58) Field of Search ................................ 526/173, 176, 526/177, 187, 528; 423/27, 54, 68, 98, 139, 150.1, 181

(56) References Cited

U.S. PATENT DOCUMENTS

| 4,522,928 A | * | 6/1985 | McVicker et al. ............. 502/26 |
| 5,073,622 A | * | 12/1991 | Wojtech et al. ............. 528/486 |
| 6,239,231 B1 | | 5/2001 | Fujishima et al. |
| 6,329,480 B1 | * | 12/2001 | Uchiumi et al. ............. 526/173 |

FOREIGN PATENT DOCUMENTS

| JP | A356523 | 3/1991 |
| JP | A6192318 | 7/1994 |

* cited by examiner

*Primary Examiner*—David W. Wu
*Assistant Examiner*—Satya B Sastri
(74) *Attorney, Agent, or Firm*—Birch, Stewart, Kolasch & Birch, LLP

(57) ABSTRACT

An industrially excellent process for producing a poly(meth) acrylate having a reduced metal content which comprises contacting a mixture of a poly(meth)acrylate and an organic solvent with an acidic aqueous solution, such as an aqueous solution obtained by dissolving a polyprotic carboxylic acid having about 2 to 12 carbon atoms in water, is provided, and, by this invention, contents of metals such as sodium, potassium, iron and the like can be remarkably reduced.

5 Claims, No Drawings

PROCESS FOR PRODUCING POLY (METH) ACRYLATES HAVING REDUCED METAL CONTENT

BACKGROUND OF THE INVENTION

The present invention relates to a process for producing a poly(meth)acrylate having a reduced metal content. More precisely, the invention relates to a process for producing a poly(meth)acrylate having a reduced metal content which comprises contacting a mixture of a poly(meth)acrylate and an organic solvent with an acidic aqueous solution.

DESCRIPTION OF RELATED ART

Poly(meth)acrylates have been used in a variety of fields. When used as a resin component in photoresist compositions, it is believed that existence of metals therein decreases yield of integrated circuits, and therefore products having a reduced metal content are demanded. Possible processes for producing poly(meth)acrylates having a reduced metal content include a process in which a mixture containing a poly(meth)acrylate and an organic solvent is contacted with an ion-exchange resin, a process in which said mixture is passed through a filter, and so on.

The process using an ion-exchange resin, however, has a difficulty in selection of the ion-exchange resin when various metal ions are contained, and, in order to remove various metals, plural kinds of ion-exchange resins must sometimes be used. This process has another problem that removal of non-ionic metal is difficult.

On the other hand, the process containing passage through a filter has a problem that removal of an ionic metal, if any, is difficult.

Under these circumstances, the inventors have conducted extensive researches on processes for effectively producing poly(meth)acrylates having a reduced metal content. As the results, they have found the fact that contents of various metals can be reduced, by one effort and in a remarkable degree, by contacting with an acidic aqueous solution, and thus completed the invention.

SUMMARY OF THE INVENTION

The invention provides an industrially excellent process for producing a poly(meth)acrylate having a reduced metal content which comprises contacting a mixture of a poly (meth)acrylate and an organic solvent with an acidic aqueous solution.

DETAILED DESCRIPTION OF THE INVENTION

The poly(meth)acrylates used in the invention are usually products having a weight average molecular weight, measured by GPC (Gel Permeation Chromatography) converted to polystyrene, of about 1,000 to 100,000, and include resins having a repeating unit of a (meth)acrylate, such as resins having a repeating unit represented by the following formula (I):

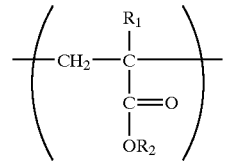

wherein $R_1$ represents hydrogen or an alkyl having 1 to 4 carbon atoms, and $R_2$ represents an organic group.

In the above formula, examples of $R_1$ include hydrogen, methyl, ethyl, 1-propyl, 2-propyl, 1-butyl, 2-butyl, 2-methyl-1-propyl, 2-methyl-2-propyl and the like. Amongst, hydrogen and methyl are preferred.

Examples of the organic group represented by $R_2$ include alkyls which may be straight-chained or branched, cyclic alkyls, cyclicethers, cyclicesters and the like. The alkyls which may be straight-chained or branched, cyclic alkyls, cyclic ethers and cyclic esters may have a substituent such as alkyl, acyl, acyloxy, alkoxy, oxycarbonyl, hydroxyl, aromatic groups and the like. Among them, alkyls which may be straight-chained or branched and may have a substituent selected from hydroxyl, alkoxy, acyl and acyloxy, and cyclic alkyls which may have a substituent selected from hydroxyl, alkoxy, acyl and acyloxy are preferred as the organic group represented by $R_2$. Specific examples of the organic group represented by $R_2$ include methyl, ethyl, 1-propyl, 2-propyl, 1-butyl, 2-methyl-2-propyl, cyclohexyl, cycloheptyl, 1-adamantyl, 2-methyl-2-adamantyl, 2-ethyl-2-adamantyl, 2-acetyloxyethyl, methoxycarbonylmethyl, 2-oxoxolane-3-yl, 2-oxoxolane-4-yl, 2-methoxyethyl, 2-ethoxyethyl, 1-methoxyethyl, 1-ethoxyethyl, 1-tetrahydropyranyl, 2-hydroxy-1-ethyl, 2-hydroxy-2-propyl, 3-hydroxy-2-adamantyl and the like. Examples of aromatic groups as the substituent on alkyl include benzyl and the like. Elimination of $R_2$ by hydrolysis is possible under acidic conditions, in the case of resins in which a bound site to (meth)acrylic acid is a tertiary carbon or resins in which said site is an acetal, for example, resins wherein $R_2$ is 2-methyl-2-propyl, 1-adamantyl, 2-methyl-2-adamantyl, 2-ethyl-2-adamantyl, 3-hydroxy-2-adamantyl and the like, or 1-methoxyethyl, 1-ethoxyethyl, 1-tetrahydropyranyl and the like, which are useful as resins for resists for high-energy radiations such as far ultraviolet rays (including excimer laser and the like), electronic rays, X-rays or radiation lights. According to the invention, however, poly(meth)acrylates having a reduced metal content can be produced substantially without hydrolysis.

Examples of the poly(meth)acrylates include various resins described in D. C. Hofer et al., Journal of Photopolymer Science and Technology, Vol. 9, No. 3 (1996), 387–398. These resins are usually obtained by polymerization of a (meth)acrylate or by copolymerization with another monomer having an ethylenically unsaturated bond. These resins may be used singly or can be used in mixture of two or more. The poly(meth)acrylates may contain various surfactants, various acid generating agents, various stabilizers or the like.

The organic solvent used in the invention includes ethers such as diethyl ether, diisopropyl ether, tetrahydrofuran, ethylene glycol dimethyl ether and the like; esters such as ethyl acetate, butyl acetate and the like; ketones such as methyl isobutyl ketone, ethyl isobutylketone, methyl amyl ketone, cyclohexanone and the like; glycol ether esters such as ethyl cellosolve acetate, methyl cellosolve acetate, propylene glycol monomethyl ether acetate and propylene glycol monoethyl ether acetate; glycol mono- or di-ethers such as ethyl cellosolve, methyl cellosolve, propylene glycol monomethyl ether, propylene glycol monoethyl ether and diethylene glycol dimethyl ether; aliphatic hydrocarbons such as n-hexane, n-heptane and the like; aromatic hydrocarbons such as benzene, toluene and the like; and halogenated hydrocarbons such as methylene chloride, chloroform and the like. These solvents can respectively be used singly or in combination of two or more. The organic solvent is not particularly limited insofar as it is not an organic solvent that can be mixed in a free proportion with water.

The amount of the solvent to be used is usually about 1 to 100 times by weight of the poly(meth)acrylate used.

The acidic aqueous solution used in the invention includes aqueous solutions obtained by dissolving an inorganic acid in water such as aqueous solution of hydrochloric acid, aqueous solution of sulfuric acid, aqueous solution of nitric acid and the like; and aqueous solutions obtained by dissolving an organic acid such as methanesulfonic acid, ethanesulfonic acid, camphorsulfonic acid, acetic acid, butanoic acid, succinic acid, fumaric acid, maleic acid, malonic acid, adipic acid, oxalic acid and the like in water. These acidic aqueous solutions can be used singly or in combination of two or more.

Among them, aqueous solutions obtained by dissolving a polyprotic carboxylic acid having about 2 to 12 carbon atoms, such as oxalic acid, succinic acid, fumaric acid, maleic acid, malonic acid and adipic acid, in water are preferably used.

The concentration and amount of the acidic aqueous solution is not particularly limited insofar as it has no adverse effect on the poly(meth)acrylate. Usually, the concentration of the aqueous solution is about 0.1 to 10% by weight and the amount of the aqueous solution is usually about 1 to 5 holds—by weight of the poly(meth)acrylate. Water used here is preferably ion-exchanged water having an electric resistance of 10 MΩ or above.

The invention is characterized in that the acidic aqueous solution as described above is contacted with a mixture of a poly(meth)acrylate and an organic solvent. The contact may be performed so that the both components are sufficiently contacted. The contact may be carried out by a single step or multi-steps countercurrent or reverse current treatment. Preferred contacting mean includes extraction. The extraction is carried out, for example, by mixing once the above organic solvent solution with the above aqueous solution, or repeatedly mixing plural times, for example 3 or 4 times, using fresh aqueous solutions (countercurrent extraction or multi-steps countercurrent extraction), or mixing once to plural times re-using the aqueous solution obtained after the above countercurrent extraction (reverse current extraction or multi-steps reverse current extraction). Although conditions such as temperature and period in extraction are not particularly limited insofar as they do not have adverse effect on poly(meth)acrylates, preferably it is effected at 20 to 70° C. for 10 minutes or more per mixing.

After carrying out the contacting treatment with an aqueous solution containing an acidic compound, the mixture of a poly(meth)acrylate and an organic solvent separated from said aqueous solution is preferably subjected further to a contacting treatment with ion-exchanged water. The ion-exchanged water used here preferably has an electric resistance of 10 MΩ or above. The contacting treatment may be once but plural time repeating is also effective in such manner that a mixture with an organic solvent and ion-exchanged water are mixed, separated, and the organic layer is mixed again with ion-exchanged water, separated again, and sometimes the procedure is repeated further. The amount of the ion-exchanged water used in the contacting treatment and conditions such as temperature and period may be almost similar to those in the contacting treatment with an aqueous solution containing an acidic compound described above. After completing the contacting treatment with ion-exchanged water, water contained in a mixture of poly(meth)acrylate and an organic solvent can easily be removed by vacuum distillation or azeotropic distillation.

EXAMPLES

The invention will now be described in more detail with reference to Examples, which should not be construed as a limitation upon the scope of the invention. In Examples, percentage and part indicating contents and amounts are weight-based unless otherwise specified.

In the following Synthesis Examples and Examples, molecular weights of the resins were measured by GPC and converted to polystyrene; and contents of various metals were measured by ICP (Inductively Coupled Plasma—mass spectrometry).

Synthesis Example 1

Copolymer of 2-ethyl-2-adamantyl methacrylates, 3-hydroxy-1-adamantyl methacrylates and α-methacryloyloxy-γ-butyrolactone Into 22.44 parts of methyl isobutyl ketone were dissolved 17 parts of 2-ethyl-2-adamantylmethacrylate, 8.12 parts of 3-hydroxy-1-adamantyl methacrylate and 5.82 parts of α-methacryloyloxy-γ-butyrolactone. This was referred to as Monomer solution. Into 7.74 parts of methyl isobutyl ketone was dissolved 0.45 part of 2,2'-azobis(isobutyronitrile). This was referred to as Initiator solution.

Monomer solution and Initiator solution were concurrently added to 47.19 parts of degassed methyl isobutyl ketone at 87° C. and they were allowed to react 6 more hours after concurrent addition. After cooling to 60° C., a small amount was sampled and analyzed for various metals in the reaction mass. The results are shown in Table 1.

Then, the mass was washed once with an aqueous solution of oxalic acid consisting of 0.08 part of oxalic acid and 15.39 parts of ion-exchanged water, and 3 times with 15.47 parts of ion-exchanged water. This was then charged to a solution consisting of 618.9 parts of methanol and 154.7 parts of ion-exchanged water. After 30 minutes of stirring, the mass was filtered and the filtered matter was re-pulped 3 times with an aqueous methanol consisting of 154.7 parts of methanol and 38.7 parts of ion-exchanged water. Then, it was dried to give 15.8 parts of Resin A.

Resin A had the following structure:

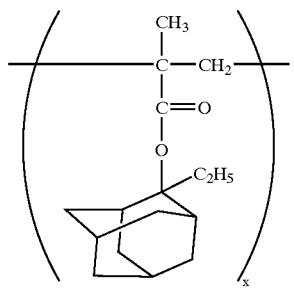

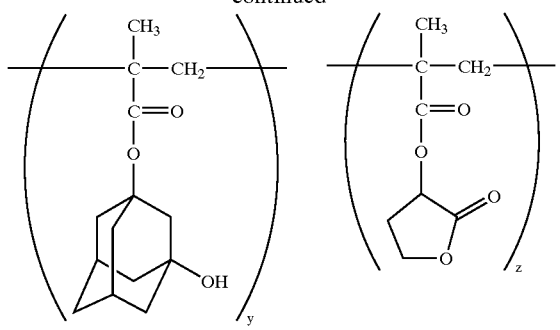

The result of $^{13}$C-NMR measurement showed x:y:z= 31:36:33. The resin had a weight average molecular weight of 10,000.

Example 1

A mixture of 3 parts of Resin A and 18 parts of propylene glycol methyl ether acetate was stirred at 40° C. until dissolution. Washing with an aqueous oxalic acid consisting of 0.105 part of oxalic acid and 5.145 parts of ion-exchanged water was carried out once at 40 to 50° C., followed by separation. Then, washing with 5.25 parts of ion-exchanged water, followed by separation was repeated by 5 times. The obtained organic layer was concentrated to 10.59 parts to give a resin solution. Contents of various metals in this solution were measured. The results are shown in Table 1. The resin concentration in this solution was calculated to be 29% solution from the charged amounts. Values converted to 100% resin are also shown.

TABLE 1

| Metal | Before treatment (ppb) | After treatment (ppb) | After treatment* (ppb) |
|---|---|---|---|
| Na | 800 | 8 | 27 |
| K | 240 | 4 | 14 |
| Mg | 280 | 1 | 3 |
| Ca | 1400 | 8 | 27 |
| Fe | 4200 | 15 | 51 |
| Cu | 43 | <1 | <3 |
| Mn | 84 | <1 | <3 |
| Al | 160 | 2 | 7 |
| Zn | 3700 | 1 | 3 |
| Ni | 97 | 1 | 3 |
| Cr | 320 | 26 | 89 |
| Pb | 37 | <1 | <3 |

*Value converted to 100% resin

Synthesis Example 2

Copolymer of β-methacryloyloxy-γ-butyrolactone and 2-ethyl-2-adamantyl methacrylate Copolymerization of β-methacryloyloxy-γ-butyrolactone and 2-ethyl-2-adamantyl methacrylate was carried out according to the description in JP-A-10-31959. Analytic values for various metals in the reaction mass are shown in Table 2. Thereafter, the mass was post-treated according to the description in JP-A-10-31959 to give Resin B.

Resin B had the following structure:

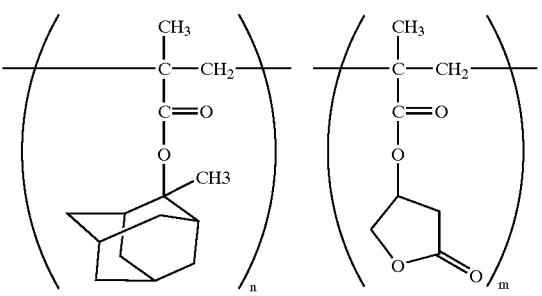

The result of $^1$H-NMR measurement showed n:m=53:47. The resin had a weight average molecular weight of 10,000. Metal contents in this resin are shown in Table 2.

Example 2

A mixture of 1 part of Resin B and 10 parts of propylene glycol methyl ether acetate was stirred at 40° C. until dissolution. Washing with an aqueous oxalic acid consisting of 0.044 part of oxalic acid and 2.156 parts of ion-exchanged water was carried out once at 30° C., followed by separation. Then, washing with 2.2 parts of ion-exchanged water was carried out once, followed by separation. The obtained organic layer was further washed once with an aqueous oxalic acid consisting of 0.044 part of oxalic acid and 2.156 parts of ion-exchanged water at 30° C., followed by separation. Then, washing with 2.2 parts of ion-exchanged water, followed by separation, was carried out twice. Then the obtained organic layer was further washed with 2.2 parts of ion-exchanged water, followed by separation, and this was repeated two more times. The organic layer obtained by washing in this manner was concentrated to 3.109 parts to give a resin solution. Analytic results of various metals in this resin solution are shown in Table 2. The solution was calculated to be 31% solid solution by loss-on-drying method. Values converted to 100% resin are also shown in Table 2.

TABLE 2

| Metal | Before treatment (ppb) | After treatment (ppb) | After treatment* (ppb) |
|---|---|---|---|
| Na | 530 | 2 | 6 |
| Ca | 3500 | 6 | 19 |
| Fe | 10000 | 3 | 10 |
| Zn | 3800 | 2 | 6 |

*Value converted to 100% resin

According to the invention, contents of metals such as sodium, potassium, iron and the like can be remarkably reduced. Therefore, poly(meth)acrylates having a reduced metal content can be produced with industrial advantages.

What is claimed is:

1. A process for producing a poly(meth)acrylate having a reduced metal content and in which a bound site to (meth) acrylic acid is a tertiary carbon or in which said site is an acetal,
   which comprises contacting a mixture of a poly(meth) acrylate in which a bound site to (meth)acrylic acid is a tertiary carbon or in which said site is an acetal and an organic solvent with an acidic aqueous solution obtained by dissolving oxalic acid in water.

2. The process according to claim 1, wherein the poly(meth)acrylate has a weight average molecular weight of about 1,000 to 100,000.

3. The process according to claim 1, wherein the poly(meth)acrylate is a resin having a repeating unit represented by the following formula (I):

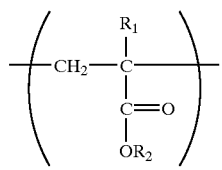
(I)

wherein $R_1$ represents hydrogen or an alkyl having 1 to 4 carbon atoms, and $R_2$ represents 2-methyl-2-propyl, 1-adamantyl, 2-methyl-2-adamantyl, 2-ethyl-2-adamantyl, 2-hydroxy-2-adamantyl, 1-methoxyethyl, 1-ethoxyethyl or 1-tetrahydropyranyl.

4. The process according to claim 3, wherein $R_1$ represents hydrogen or methyl.

5. The process according to claim 3, wherein $R_2$ represents 1-adamantyl, 2-methyl-2-adamantyl, 2-ethyl-2-adamantyl or 3-hydroxy-2-adamantyl.

* * * * *